United States Patent [19]

Kuze et al.

[11] Patent Number: 5,498,454

[45] Date of Patent: Mar. 12, 1996

[54] POLYESTER FILM, LAMINATED METAL SHEET AND METAL CONTAINER

[75] Inventors: Katsuaki Kuze; Hiroshi Nagano; Saburoh Ohta; Kuniharu Mori, all of Inuyama; Tsutomu Isaka, Osaka, all of Japan

[73] Assignee: Toyo Boseki Kabushiki Kaisha, Osaka, Japan

[21] Appl. No.: 288,477

[22] Filed: Aug. 10, 1994

[30] Foreign Application Priority Data

| Aug. 10, 1993 | [JP] | Japan | 5-198512 |
| Oct. 27, 1993 | [JP] | Japan | 5-269228 |
| Nov. 9, 1993 | [JP] | Japan | 5-279791 |
| Nov. 9, 1993 | [JP] | Japan | 5-279796 |

[51] Int. Cl.$^6$ ............................ B29D 22/00; B32B 15/08
[52] U.S. Cl. ................ 428/35.9; 428/327; 428/328; 428/331; 428/458; 428/480; 428/483
[58] Field of Search .................... 428/480, 458, 428/323, 328, 35.9, 327, 331, 483

[56] References Cited

U.S. PATENT DOCUMENTS

| 5,132,391 | 7/1992 | White et al. | 428/458 |
| 5,240,779 | 8/1993 | Ono et al. | 428/458 |
| 5,252,404 | 10/1993 | Ishihara et al. | 428/458 |
| 5,262,513 | 7/1992 | Tanaka et al. | 528/272 |
| 5,302,686 | 7/1993 | Tanaka et al. | 428/35.7 |

FOREIGN PATENT DOCUMENTS

| 0550011A3 | 7/1993 | European Pat. Off. . |
| 0580404A2 | 1/1994 | European Pat. Off. . |
| 0576682A1 | 1/1994 | European Pat. Off. . |
| 0586161A1 | 3/1994 | European Pat. Off. . |
| 43-023348 | 9/1965 | Japan . |
| 2296860 | 12/1990 | Japan . |
| 3181549 | 8/1991 | Japan . |
| 3181550 | 8/1991 | Japan . |
| 5079990 | 4/1993 | Japan . |
| 2055687 | 3/1981 | United Kingdom . |
| WO93/14152 | 7/1993 | WIPO . |

OTHER PUBLICATIONS

EPO Search Report (including Derwent abstracts), Nov. 18, 1994.

*Primary Examiner*—P. C. Sluby
*Attorney, Agent, or Firm*—Leydig, Voit & Mayer Ltd.

[57] ABSTRACT

A polyester film having a coefficient of dynamic friction between the film and a metal at 80° C. of not more than 0.45, a polyester film composed of a polyester comprising an ethylene terephthalate unit in a proportion of 70% or more by mole, the polyester film comprising a cyclic ethylene terephthalate trimer in a proportion of 0.7% or less by weight, laminated metal sheets and metal containers manufactured from said laminated metal sheet. According to the present invention, the polyester film shows superior sliding property and superior scratch resistance during can production, as well as the elution of oligomer from the film can be suppressed, so that when the film is used for metal containers for food, the change in taste and smell of the food contained therein and degraded appearance of the surface of the film caused by the deposition of oligomer are avoided.

18 Claims, No Drawings

POLYESTER FILM, LAMINATED METAL SHEET AND METAL CONTAINER

FIELD OF THE INVENTION

The present invention relates to a polyester film for laminating with a metal material mainly usable for food such as soft drinks, beer and canned food, a metal sheet laminated with said film and to metal containers produced by forming said laminated metal sheet into a can shape. More particularly, the present invention relates to a polyester film with superior scratch resistance during can production process to afford good productivity of the cans, a metal sheet laminated with said film and to metal containers produced by forming said laminated metal sheet into a can shape. Moreover, the present invention relates to a polyester film with suppressed elution of low molecular substances from the film due to a heat treatment after packing the food therein, such as retort treatment, a metal sheet laminated with said film and to metal containers produced by forming said laminated metal sheet into a can shape.

BACKGROUND OF THE INVENTION

For inhibiting corrosion of the inner and outer surfaces of metal cans, paints are conventionally applied, wherein used as the paints are thermosetting resins.

Other methods include the use of thermoplastic resins. For example, a polyolefin film is laminated with a tin-free steel heated or a polyester film with good heat resistance is laminated with a metal sheet to be used for cans.

Many thermosetting paints are of solvent type. For forming a coating therefrom, a high temperature heating for a long time at 150°–250° C. for several minutes and baking which undesirably causes evaporation of a large amount of organic solvent are necessary. Accordingly, simplification of steps and improvements to prevent pollution are desired. It is inevitable, moreover, that a small amount of organic solvent remains in the coating when the thermosetting paints are applied under the above-mentioned conditions and the remainder of the organic solvent migrates into the food packed in a metal can applied with the coating to result in degraded taste and smell of the food. Also, the additives in the paint or low molecular substances which may be produced by an incomplete crosslinking reaction may move into the food to exert the same adverse influences.

Of the above-mentioned problems, simplification of the steps and prevention of pollution can be achieved by the use of thermoplastic resin films. However, polyolefin films such as those made from polyethylene and polypropylene, which are among thermoplastic resins, have poor heat resistance and sometimes whiten and peel off from a metal sheet upon a retort treatment. In addition, polyolefin films are soft and poor in scratch resistance. The poor scratch resistance of the film causes problems that, for example, scratches occur on the film surface during transporting each laminated metal sheet or seaming sheets into a can in a can manufacture process, thus impairing the product value.

While the problem caused by the migration of residual solvent as observed when a thermosetting paint is applied can be overcome by the use of polyolefin films, the migration of low molecular substances produced during forming a coating or that of additives such as a heat stabilizer into food still exerts disadvantageous effects on taste and smell of the food. The polyolefin film, moreover, adsorbs aromatic ingredients in the food and is poor in flavor resistance.

On the other hand, the use of a polyester film from among the thermoplastic resin films is most preferable because the above-mentioned difficulties which polyolefin films encounter can be overcome.

Although polyester films generally show superior scratch resistance as compared with polyolefin films, the resistance is not entirely satisfactory and an improvement thereof is desired. So as to improve the scratch resistance, the application of an organic coating superior in lubricating property and scratch resistance to the surface of a polyester film has been proposed. While the scratch resistance can be unquestionably improved by this coating method, this method necessitates the use of an organic solvent during the process of forming an organic coating and a very small portion of the solvent remains in the organic coating obtained. Accordingly, when a food is packed in a metal container manufactured from this film, the organic solvent adversely affects the taste and smell of the food. There is also a problem that low molecular substances elute out from the organic coating to exert adverse influence as does the residual organic solvent as described.

The polyester film is superior in heat resistance so that an additive such as a heat stabilizer is not necessary and it produces less amounts of low molecular substances. As a result, the problems of degraded taste and smell of food caused by the migration of additives or low molecular substances can be markedly alleviated as compared with polyolefin films. The polyester films mainly comprising polyethylene terephthalate, however, contains low molecular substances produced during polymerization process and film forming process, i.e. oligomer based mainly on a cyclic ethylene terephthalate trimer (hereinafter also referred to merely as oligomer), and said oligomer may elute out from the film into food or may precipitate on the surface of a laminate film, giving rise to an appearance problem.

SUMMARY OF THE INVENTION

Accordingly, an object of the present invention is to provide a polyester film superior in scratch resistance, and a laminated metal sheet and a metal container produced by the use of said polyester film.

Another object of the present invention is to provide a polyester film with suppressed elution of oligomer, and a laminated metal sheet and a metal container produced by the use of said polyester film.

DETAILED DESCRIPTION OF THE INVENTION

Firstly, the present invention provides a polyester film having a coefficient of dynamic friction between the film and a metal at 80° C of not more than 0.45. A coefficient of dynamic friction between the film and a metal at 80° C. of not more than 0.45 can contribute to the desired superior scratch resistance. Particularly, the present invention relates to a polyester film composed of a polyester comprising an ethylene terephthalate unit in a proportion of 70% or more by mole, the polyester film comprising a cyclic ethylene terephthalate trimer in a proportion of 0.7% or less by weight; a polyester film made from a polyester composition comprising polymer particles of 0.5–5 µm in average particle size in a proportion of 0.3–5% by weight; a polyester film made from a polyester composition comprising inorganic fine particles of 0.5–5 µm in average particle size in a proportion of 0.3–5% by weight; and a polyester film made from a polyester composition comprising a thermoplastic resin incompatible with polyester in a proportion of 0.3–5% by weight. In addition, the present invention relates to a polyester film comprising a polyester layer (layer A) having a coefficient of dynamic friction between the film and a metal at 80° C. of not more than 0.45 and a polyester layer (layer B) having a melting point of 180°–240° C.

Secondly, the present invention provides a polyester film composed of a polyester comprising an ethylene terephthalate unit in a proportion of not less than 70% by mole, wherein a cyclic ethylene terephthalate trimer is contained in a proportion of not more than 0.7% by weight. A cyclic ethylene terephthalate trimer content of not more than 0.7% by weight can suppress the elution of an oligomer, achieving the second object of the invention.

Also, the present invention provides a polyester film composed of a polyester comprising a cyclic ethylene terephthalate trimer in a proportion of not more than 0.5% by weight, which is obtainable by solid polymerization after heat-treating a polyester with a dihydric alcohol.

Further, the present invention provides a metal sheet laminated with the polyester film of the above and metal containers manufactured from said laminated metal sheet.

The polyester to be used in the present invention is obtained by condensation polymerization of a polycarboxylic acid and a polyhydric alcohol.

The polycarboxylic acid component includes, for example, dicarboxylic acid such as aromatic dicarboxylic acid (e.g. terephthalic acid, isophthalic acid, phthalic acid, naphthalene dicarboxylic acid, diphenyl dicarboxylic acid), aliphatic dicarboxylic acid (e.g. adipic acid, azelaic acid, sebacic acid, decanedicarboxylic acid, dodecanedicarboxylic acid, dimer acid) and alicyclic dicarboxylic acid (e.g. cyclohexane-dicarboxylic acid). Of these, aromatic dicarboxylic acids such as terephthalic acid, isophthalic acid and naphthalene-dicarboxylic acid are preferable in terms of flavor resistance.

The polyhydric alcohol component includes glycols such as aliphatic diols (e.g. ethylene glycol, diethylene glycol, triethylene glycol, propanediol, butanediol, hexanediol, dodecanemethylene glycol, neopentyl glycol), alicyclic diols (e.g. cyclohexanedimethanol) and aromatic diols (e.g. addition product of bisphenol derivative with ethylene oxide), with preference given to ethylene glycol.

It is preferable that 70% by mole or more and more preferably 80% by mole or more of the constituent components of said polyester should be an ethylene terephthalate unit. When the ethylene terephthalate unit is less than 70% by mole, heat resistance tends to become poor to often cause stretching of a film when laminating with a metal to form a can, or reduction of width and occurrence of wrinkles due to the contraction by heat. As a result, laminating conditions may need to be modified so as to avoid such problems and productivity may become poor. In addition, the cost of the starting material polyester may become unbeneficially high.

As said polyester, polyethylene terephthalate or polyethylene terephthalate added with 0.6–6% by weight (converted to polyether component) of a polyester-polyol block copolymer is particularly preferable. The polyester preferably suppresses whitening of film which is caused by a treatment with hot water, such as a retort treatment.

From the aspect of dynamic properties, the polyester; preferably has an intrinsic viscosity of not less than 0.5, more preferably 0.55–0.85.

There is no limitation imposed on the production of the above-mentioned polyester and the polyester can be produced by conventionally-known ester exchange or direct polymerization. The solid phase polymerization may be used for increasing the molecular weight. The solid phase polymerization is preferable in that the content of the cyclic ethylene terephthalate trimer to be mentioned later can be reduced.

The polyester film of the present invention preferably has a coefficient of dynamic friction between the film and a metal at 80° C. of not more than 0.45, more preferably 0.40–0.20 and most preferably 0.35–0.20. When the coefficient of dynamic friction is not more than 0.45, scratch resistance reaches a practical level and metal containers with good appearance can be obtained even if the can manufacturing speed is increased, thus enhancing the productivity of can manufacture.

So as to make the coefficient of dynamic friction not more than 0.45, a polyester composition comprising at least one component selected from polymer particles of 0.5–5 μm in average particle size, inorganic fine particles of 0.5–5 μm in average particle size and thermoplastic resins incompatible with polyester, in a proportion of 0.3–5% by weight in total may be used. The above-mentioned components may be used alone or in combination, with preference given to a combined use.

As the polymer particle, any suffices for use insofar as it stands the temperature of melt-forming the polyester. For example, the polymer particles may be obtained by addition polymerization, condensation polymerization or polyaddition reaction. Examples of those obtained by addition polymerization include polymers of acrylic monomers such as acrylic acid, methacrylic acid, acrylate and methacrylate; polymers of styrene monomers such as styrene and alkyl-substituted styrene; copolymers of acrylic monomer and styrene monomer; copolymers of acrylic monomer and crosslinking monomer such as divinylbenzene, divinylsulfone, ethylene glycol dimethacrylate, trimethylolpropane trimethylacrylate and pentaerythritol tetramethylacrylate; copolymers of styrene monomer and crosslinking monomer; and copolymers of acrylic monomer, styrene monomer and crosslinking monomer. Examples of those obtained by condensation polymerization or polyaddition reaction include polymer particles of melamine resins, benzoguanamine resins, phenol resins and silicone resins. Of these, preferred are polymer particles obtained from copolymers of acrylic monomer and/or styrene monomer and crosslinking monomer. Said polymer particles may be used alone or in combination.

The method for producing said polymer particles is not subject to any particular limitation and conventional emulsion polymerization and suspension polymerization may be used. Pulverization or classification may be done on demand to adjust the particle size and particle distribution of said polymer particles.

The inorganic fine particles may be any insofar as they are insoluble in polyester and are inert. Specific examples include metal oxides such as silica, alumina, zirconia and titanium oxide, compound oxides such as kaolin, zeolite, sericite and sepiolite, sulfates such as calcium sulfate and barium sulfate, phosphates such as calcium phosphate and zirconium phosphate, and carbonates such as calcium carbonate. These inorganic fine particles may be natural or synthetic and are subject to no particular limitation on particle shape. The inorganic fine particles may be used alone or in combination. When the inorganic fine particles alone are used, a combination of cohesive amorphous silica or spherical silica and zeolite is preferable.

Examples of thermoplastic resin incompatible with polyester include polyolefin resins, polystyrene resins, polyacrylic resins, polycarbonate resins, polyamide resins, polysulfone resins and aromatic polyester resins. The thermoplastic resin may be used alone or in combination. In addition, these resins need not be particles.

When the polymer particles and inorganic fine particles are used, an average particle size is preferably 0.5–5 µm, more preferably 0.8–4 µm. When it is less than 0.5 µm, sliding property between a film and a metal at high temperatures is not sufficiently improved and improvement in resistance to scratch tends to be unclear. An average particle size of more than 5 µm may pose saturation on the improvement in sliding property between a film and a metal at high temperatures, may cause falling off of fine particles on friction, and may result in rupture when forming a film.

The polymer particles, inorganic fine particles and thermoplastic resin incompatible with polyester are preferably contained in a proportion of 0.3–5% by weight in total and more preferably 0.5–3% by weight in total per the entire amount of a polyester composition. When they are contained in a proportion of less than 0.3% by weight, improvement in sliding property between a film and a metal at high temperatures becomes small and scratch resistance tends to hardly manifest itself. The content of more than 5% by weight, on the other hand, may pose saturation on the improvement in sliding property between a film and a metal at high temperature or may cause poor film formability.

The above-mentioned polymer particles, inorganic fine particles and thermoplastic resin incompatible with polyester may be added to a polyester during the manufacturing process of the polyester, or a polyester and the above-mentioned component may be mixed and melt-kneaded. Alternatively, the above ingredients may be added in a master batch containing them at high concentrations.

The polyester film of the present invention contains a cyclic ethylene terephthalate trimer produced during polymerizing or forming a coating, preferably in a proportion of not more than 0.7% by weight per the total amount of the polyester, by which the elution of an oligomer can be further suppressed. More preferably, it is contained in a proportion of not more than 6% by weight and most preferably in a proportion of not more than 5% by weight. When the cyclic ethylene terephthalate trimer is contained in a proportion of more than 0.7% by weight, elution of an oligomer from a film tends to increase due to the heat treatment after packing the food (retort treatment). When the inside of a can is laminated with the film, the oligomer migrates into the food and tends to exert an adverse influence on the taste and smell of the food. On the other hand, when the outside of a can is laminated with the film, the oligomer may deposit on the surface of the film to lose good appearance of the can.

No particular limitation is imposed on the method for adjusting the cyclic ethylene terephthalate trimer content to not more than 0.7% by weight and the cyclic ethylene terephthalate trimer may be extracted and removed from the film by the use of water or an organic solvent. Alternatively, a polyester containing a cyclic ethylene terephthalate trimer in a less amount may be used as a starting material. The latter is more economical and preferable.

There is no particular limitation imposed on the method for producing a polyester with a smaller cyclic ethylene terephthalate trimer content, and heating under reduced pressure, solid phase polymerization, extraction with water or an organic solvent and a combination of these methods may be used. In particular, a method including the use of a polyester comprising a cyclic ethylene terephthalate trimer in a proportion of not more than 0.5% by weight, which is obtainable by solid polymerization to be done after heat-treating a starting material polyester with a dihydric alcohol such as ethylene glycol, is most desirable. Different from conventional solid polymerization, this method permits reduction of the cyclic ethylene terephthalate trimer content without increasing the polymerization degree of the polyester. The low polymerization degree which cannot be achieved by low oligomer polyesters obtained by the conventional solid phase polymerization results in good melt flow of a polyester during the film forming process, reduced load on melt extruder and less facility cost for melt extrusion, thus providing a preferable mode of the embodiment.

The polyester film of the present invention may contain heat stabilizer, antioxidant, ultraviolet absorber, plasticizer, pigment, antistatic agent, lubricant, crystalline nucleus and so on demand.

The polyester film of the present invention may be either an unoriented film or an oriented film insofar as the aforementioned requirements are met. In the case of an oriented film, it may be uniaxially oriented or biaxially oriented, with preference given to a biaxially oriented film in terms of isotropy.

The method for producing the polyester film is not limited. For example, an oriented film may be prepared by a conventional method such as a T-die method or a tubular method.

The polyester film may be mono-layered or plurally-layered. Any plurally-layered film will suffice for use as long as the requirements that at least either outermost layer (at least the opposite side of the layer in contact with the metal surface when forming a laminated metal sheet) shows a coefficient of dynamic friction between a film and a metal at 80° C. of not more than 0.45, and that the content of a cyclic ethylene terephthalate trimer is not more than 0.7% by weight are satisfied.

The polyester film preferably has a thickness of 3–100 µm, more preferably 4–50 µm and most preferably 5–30 µm in the case of a monolayer film.

The polyester film of the present invention may be a composite film of a polyester layer (layer A) having a coefficient of dynamic friction between a film and a metal at 80° C. of not more than 0.45 and a polyester layer (layer B) having a melting point of 180°–240° C.

The coefficient of dynamic friction of the polyester layer A is preferably not more than 0.45 and can be adjusted so by the same method as described above including addition of at least one member from polymer particles, inorganic fine particles and thermoplastic resin incompatible with polyester to polyester. The coefficient of dynamic friction is more preferably 0.40–0.20 and most preferably 0.35–0.20. When the coefficient of dynamic friction of the polyester layer A is not more than 0.45, scratch resistance reaches a practical level and metal containers with good appearance can be obtained even if the can manufacturing speed is increased, thus enhancing the productivity of can manufacture.

The melting point of the polyester layer B is preferably 180°–240° C. and can be adjusted to fall within this range by suitably selecting the kind and amount of the copolymerizable components of the above-mentioned polyester, with preference given to the use of a copolymer of ethylene terephthalate and isophthalate. The melting point is more preferably 200°–230° C. When the melting point of the polyester layer B is lower than 180° C., heat resistance becomes poor and wrinkles are developed during laminating. When a laminated metal sheet is subjected to heat treatment such as retorting, the laminate film tends to turn white or peel off. When the melting point exceeds 240° C., heat adhesiveness becomes poor.

The thickness of the layer A of the aforementioned polyester film is preferably 3–50 μm, more preferably 5–20 μm. When the thickness is less than 3 μm, handling of the film tends to become difficult, laminate processability becomes poor and flaws such as pin hole and crack tend to occur during the can manufacture process. On the other hand, the thickness exceeding 50 μm tends to result in uneconomical, saturated effect of protection such as corrosion resistance of the metal sheet and adverse influence on adhesiveness due to a greater inner stress of the film itself. The thickness of the layer B of the aforementioned polyester film is preferably 1–15 μm, more preferably 2–10 μm. When the thickness is less than 1 μm, adhesiveness with a metal sheet becomes insufficient, while when it exceeds 15 μm, the adhesiveness with a metal sheet reaches saturation and heat resistance becomes poor.

The production of the polyester film composed of the abovementioned layers A and B is subject to no particular limitation insofar as a film satisfying the requirements as described above is obtained. For example, such film is produced by multi-layer extrusion or extrusion laminate, with preference given to multi-layer extrusion from the economical point of view.

The laminated metal sheet of the present invention is produced by laminating the aforementioned polyester film on a metal sheet. The usable metal sheet includes tin, tin-free steel or aluminum.

The above-mentioned polyester film may be laminated on the metal sheet by any method such as conventional dry laminating or thermal laminating. For example, an adhesive layer is formed on a polyester film and the adhesive side of the polyester film is laminated with a metal sheet. The adhesive layer is preferably formed on the film in a partially set state and allowed to completely set while being laminated on the metal sheet. The adhesive may be set by the use of heat, light or electron beam. The adhesive to be used in the above method may be epoxy resin, polyurethane resin, polyester resin, polyester polyurethane resin, isocyanate resin or modified resins of these resins.

When a multi-layer film composed of a polyester layer (layer A) having a coefficient of dynamic friction between the film and a metal at 80° C. of not more than 0.45 and a polyester layer (layer B) having a melting point of 180°–240° C. is desired, the layer B is preferably fitted on a metal sheet and subjected to thermal laminating. In particular, a thermal laminating by electrifying to heat the metal sheet is preferable.

Said thermal laminating is the most preferable mode, since no organic solvent remains so that adverse influences on the taste and smell of the food by the residual solvent are preventable.

The polyester film may be laminated on either side or both sides of the metal sheet. When a both-side laminating is desired, a simultaneous laminating or sequential laminating may be conducted.

The metal container of the present invention is obtained by forming the above-mentioned laminated metal sheet. The method for forming the metal container is not particularly limited. While the shape of the metal container is not limited, a so-called three-piece can which is preferable for packing retort food, coffee drinks or the like, wherein the lids of head and ail are seamed to seal the content, is preferred.

The present invention is explained in more detail by referring to Examples, to which the present invention is not limited. The following Examples are for illustrating purposes and any modification and changes made within the scope of the present invention are encompassed in the technical range of the invention.

Various tests were conducted in Examples and Comparative Examples to be mentioned later, according to the following methods.

(1) Coefficient of dynamic friction

A film sample was set on a skid weighing 1.5 kg and having a contact area of 50 mm×70 mm and the coefficient of dynamic friction when the skid was glided on a tin-free steel sheet at 80° C. and 250 mm/min was measured.

(2) Scratch resistance

Using a color fastness friction tester manufactured by Toyo Seiki, Japan, scratch resistance was measured. A friction runner set with a film sample and applied with a load of 400 g was allowed to rub in the distance of 100 mm at 30 reciprocations/min on a 80° C. tin-free steel sheet for one minute. The flaws on the film were visually observed and evaluated following the criteria below. The film evaluated with Δ or ○ is practical.

○: Flaws were scarce.

Δ: Partial flaws were observed.

×: Flaws were observed on the entirety of the film.

(3) Content of cyclic ethylene terephthalate trimer

A polyester film was dissolved in hexafluoroisopropyl alcohol/chloroform=2/3 (V/V) and polyester was deposited with methanol for filtration. The filtrate was evaporated to dryness and the dry substance was dissolved in dimethylformamide. This solution was developed by liquid chromatography and the cyclic ethylene terephthalate trimer content in the polyester film was quantitatively determined. In the case of a multi-layer polyester film, the outermost layer opposite to the side in contact with the metal surface of a laminated metal sheet to be obtained by the steps mentioned later was chipped off and subjected to the determination.

(4) Elution of oligomer

A 10 cm-square laminated steel sheet was subjected to retort treatment with 500 cc of distilled water at 120° C. for 30 minutes. After the treatment, the laminated steel sheet was air-dried and the surface of the laminated film on the steel sheet was examined with a magnifier. Elution of oligomer was evaluated following the criteria below.

observed: crystals of oligomer were found on the surface of the film none: crystals of oligomer were not found on the surface of the film (5) Melting point and glass transition temperature A differential scanning calorimeter was used for the determination. A sample was melted by heating at 300° C. for 5 minutes and rapidly cooled with liquid nitrogen. The temperature of 10 mg therefrom was raised at 10° C./min. The specific heat change based on the transition from a glass state to a rubber state was read and the temperature of the transition was taken as a glass transition temperature (Tg). The temperature of an endothermic peak based on melting of the crystals was taken as a melting point.

(6) Average particle size

The determination was done by the Colter counter method.

EXAMPLE 1

A mixture of polyethylene terephthalate (97 parts by weight) having an intrinsic viscosity of 0.65 and comprising a cyclic ethylene terephthalate trimer (0.38% by weight), which was obtained by heat-treating a mixture of polyethylene terephthalate chips (100 parts by weight) produced by melt polymerization, having an intrinsic viscosity of 0.65 and comprising a cyclic ethylene terephthalate trimer (1.0% by weight) and ethylene glycol (200 parts by weight) at 135° C. for 30 minutes; separating the polyethylene terephthalate chips; and subjecting the chips to solid polymerization at 210° C. for 14 hours under the pressure of 0.1 mmHg, and a block copolymer (3 parts by weight) of polyethylene terephthalate-polytetramethylene glycol ether was melt-extruded and sequentially subjected to biaxial orientation to give a 12 μm-thick polyester film. The cyclic ethylene terephthalate trimer content of said polyester film was 0.40% by weight.

An adhesive (a mixture of ADCOTE, a polyurethane adhesive manufactured by Toyo Ink, Japan and a curing agent) was applied on one side of the polyester film at 4 g/m$^2$ (converted to solid) and dried. The film was subjected to aging at 40° C. for 24 hours. The film was laminated on the both sides of a degreased cold-drawn steel sheet by thermal laminating to give a double laminated steel sheet.

The obtained double laminated steel sheet was placed in a pressurizer containing distilled water and heated at 120° C. for 30 minutes to evaluate the model retort treatment. The laminated steel sheet treated was taken out from the pressurizer and the surface of the film was observed. The gloss of the film surface was fine and the oligomer did not precipitate on the surface.

Comparative Example 1

By using a polyester film comprising a cyclic ethylene terephthalate trimer (0.98% by weight) as obtained in the same manner as in Example 1 except that polyethylene terephthalate comprising a cyclic ethylene terephthalate trimer (1.0% by weight) and having an Intrinsic viscosity of 0.65, which was prepared by melt polymerization, was used, a film for laminating was obtained as in Example 1. Using said film, a double laminated steel sheet was prepared as in Example 1 and subjected to the evaluation of model retort treatment in the same manner as in Example 1. The gloss of the film surface of the laminated steel sheet was poor and oligomer precipitated on the surface.

Example 2

A mixture of polyethylene terephthalate (90 parts by weight) comprising a cyclic ethylene terephthalate trimer (0.33% by weight) as used in Example 1, and a copolymerized polyester (polyester A, 10 parts by weight, cyclic ethylene terephthalate trimer content 0.7% by weight) made from terephthalic acid/isophthalic acid (molar ratio: 70/30) and ethylene glycol was used as the resin for layer A. As the resin for layer B, used was the above-mentioned polyester A. The resin for the layer A and the resin for the layer B were respectively melted in a separate extruder and melt-extruded by the coextrusion method. The sequential biaxial orientation gave a 20 μm-thick (the thickness of layer A being 17 μm and that of layer B being 3 μm) biaxially-oriented composite polyester film. The cyclic ethylene terephthalate trimer content of said layer A of the polyester film was 0.47by weight.

The layer B side of the polyester film was lapped over a tin sheet and passed between metal rolls heated at 170° C. to give a laminated tin sheet.

The obtained laminated tin sheet was subjected to the evaluation of model retort treatment In the same manner as in Example 1. The gloss of the film surface was fine and the oligomer did not precipitate on the surface.

Comparative Example 2

In the same manner as in Example 1 except that a polyethylene terephthalate comprising a cyclic polyethylene terephthalate trimer (1.0% by weight) was used, a biaxially-oriented composite polyester film was obtained. The cyclic polyethylene terephthalate trimer content of said composite film was 0.90% by weight. The obtained composite film was laminated with a tin sheet in the same manner as in Example 2 and subjected to the evaluation of model retort treatment. The surface of the film on the laminated steel sheet treated as described showed poor gloss and oligomer precipitation on the film surface.

Example 3

Polyethylene terephthalate as a resin for layer A, a copolymer of terephthalic acid/C36 dimer acid (molar ratio 85/15) and ethylene glycol as a resin for layer B and a copolymerized polyester of terephthalic acid/isophthalic acid (molar ratio 83/17) and ethylene glycol as a resin for layer C were respectively melted in a separate extruder and melt-extruded by the coextrusion method to give a 32 μm-thick (the thickness of layer A being 9 μm, that of layer B being 20 μm and that of layer C being 3 μm) unoriented composite polyester film comprising a cyclic ethylene terephthalate trimer (0.47% by weight).

The layer C side of the polyester film was lapped over a tin sheet and passed between a metal roll heated at 230° C. and a rubber roll to give a laminated tin sheet.

The obtained laminated tin sheet was formed by a press under the pressure of 100 kg/cm$^2$ to give a 100 mm diameter, 70 mm deep cup. The cup was subjected to the evaluation of model retort treatment in the same manner as in Example 1. The gloss of the film surface of the cup was fine and the oligomer did not precipitate on the surface.

Comparative Example 3

A cup made of a laminated steel sheet obtained in the same manner as in Example 3 by using the same unoriented composite polyester film except that the cyclic polyethylene terephthalate trimer content in the composite film was 0.80% by weight, was subjected to the evaluation of model retort treatment in the same manner as in Example 1. The surface of the cup treated as described showed poor gloss and oligomer precipitation on the film surface.

Example 4

A mixture of polyethylene terephthalate (97 parts by weight) comprising cohesive silica (0.1% by weight, average particle size 1.5 μm) and polymethyl methacrylate particles (1.0% by weight, spherical, average particle size 3.0 μm) crosslinked with trimethylolpropane trimethacrylate, which had an intrinsic viscosity of 0.65 and which was made to contain less amount of oligomer (cyclic ethylene terephthalate trimer 0.33% by weight) by the same method as in Example 1, and a block copolymer (3 parts by weight) of polyethylene terephthalate-polytetramethylene glycol ether was melt-extruded by a T-die method to give an amorphous sheet. The sheet was drawn 3.5-fold to the longitudinal direction and 3.5-fold to the horizontal direction at 90° C. and cured with heat at 200° C. to give a 12 μm-thick polyester film.

An adhesive (a mixture of ADCOTE, a polyurethane adhesive manufactured by Toyo Ink, Japan and a curing agent) was applied on one side of the polyester film at 4 g/m² (converted to solid) and dried, The film was subjected to aging at 40° C. for 24 hours. The film was laminated on the both sides of a degreased cold-drawn steel sheet by thermal laminating to give a double laminated steel sheet.

Example 5

In the same manner as in Example 4 except that polyethylene terephthalate (97 parts by weight) comprising cohesive silica (0.3% by weight, average particle size 1.5 μm) and spherical zeolite (1.0% by weight) and showing almost monodisperse particle size distribution (average particle size 3.0 μm) was used in place of polyethylene terephthalate (97 parts by weight) as used in Example 4, a polyester film and a laminated steel sheet were obtained.

Example 6

In the same manner as in Example 4 except that a polystyrene resin (1.0% by weight) was used in place of the crosslinked polymethyl methacrylate particles (1.0% by weight), a polyester film and a laminated steel sheet were obtained.

Example 7

In the same manner as in Example 4 except that polyethylene terephthalate (97 parts by weight) comprising spherical polystyrene particles (1.0% by weight, average particle size 2.5 μm) crosslinked with divinylbenzene and showing almost monodisperse particle size distribution was used in place of polyethylene terephthalate (97 parts by weight) as used in Example 4, a polyester film and a laminated steel sheet were obtained.

Example 8

In the same manner as in Example 4 except that polyethylene terephthalate (97 parts by weight) comprising cohesive silica (0.6% by weight, average particle size 1.5 μm) was used in place of polyethylene terephthalate (97 parts by weight) as used in Example 4, a polyester film and a laminated steel sheet were obtained.

Example 9

In the same manner as in Example 4 except that polyethylene terephthalate (97 parts by weight) comprising cohesive silica (0.3% by weight, average particle size 1.5 μm) and low density polyethylene (1.0% by weight) was used in place of polyethylene terephthalate (97 parts by weight) as used in Example 4, a polyester film and a laminated steel sheet were obtained.

Example 10

In the same manner as in Example 4 except that polyethylene terephthalate (97 parts by weight) comprising a cyclic ethylene terephthalate trimer (0.4% by weight), cohesive silica (0.25% by weight, average particle size 2.4 μm) and butyl acrylate/methyl methacrylate/styrene particles (1.0% by weight) crosslinked with divinylbenzene, the particles having an average particle size of 2.0μm and almost monodisperse particle size distribution, which had an intrinsic viscosity of 0.75 and which was prepared by solid phase polymerization, was used in place of polyethylene terephthalate (97 parts by weight) as used in Example 4, a polyester film and a laminated steel sheet were obtained.

Example 11

In the same manner as in Example 10 except that spherical silica (1.0% by weight, average particle size 2.0 μm) showing almost monodisperse particle size distribution was used in place of butyl acrylate/methyl methacrylate/styrene particles (1.0% by weight) crosslinked with divinylbenzene, a polyester film and a laminated steel sheet were obtained.

Example 12

In the same manner as in Example 10 except that 6-nylon (1.5% by weight) was used in place of butyl acrylate/methyl methacrylate/styrene particles (1.0% by weight) crosslinked with divinylbenzene, a polyester film and a laminated steel sheet were obtained.

The properties of the polyester films and laminated steel sheets obtained in the above Examples 4–12 are shown in Table 1.

The polyester films and laminated steel sheets obtained in Examples 4–12 showed fine sliding property between the film and the metal at high temperatures and superior scratch resistance. In addition, elution of oligomer was not found, proving high quality as a film for laminating with a metal and as a laminated steel sheet.

The polyester films obtained in Examples 4–12 were applied to the inside of a can barrel, and the inside and outside faces of a bottom lid, and a three-piece can was manufactured. No scratch was found on the surface of the film during can production and high speed can production was possible. Then, coffee was filled in said can and subjected to retort treatment. There were found no migration of oligomer or organic solvent from the film, no change in taste or smell of the coffee and no precipitation of oligomer on the outer surface of the bottom lid. Accordingly, the quality of the can was high.

Comparative Example 4

In the same manner as in Example 4 except that crosslinked polymethyl methacrylate particles were not used, a polyester film and a laminated steel sheet were obtained. The properties of these are shown in Table 1.

The polyester film and a laminated steel sheet obtained were poor in sliding property between the film and the metal at high temperatures and in scratch resistance. As a film for laminating with a metal and a laminated steel sheet, they had inferior quality. In the same manner as above, a three-piece can was produced. During the can production, the surface of the film developed scratch flaws and the product value was low.

Comparative Example 5

In the same manner as in Example 4 except that polyethylene terephthalate (97 parts by weight) comprising a cyclic ethylene terephthalate trimer (1.0% by weight) and cohesive silica (0.1% by weight, average particle size 1.5 μm), which was produced by melt polymerization, was used in place of polyethylene terephthalate (97 parts by weight) as used in Example 4, a polyester film and a laminated steel sheet were obtained. The properties of these are shown in Table 1.

The polyester film and a laminated steel sheet obtained were poor in sliding property between the film and the metal at high temperatures and in scratch resistance. In addition, elution of oligomer was found, thus proving low quality of the product. In the same manner as above, a three-piece can was produced and coffee was filled therein. During the can production, the surface of the film developed scratch flaws and oligomer precipitation on the outer surface of the bottom lid upon the retort treatment. Accordingly, the product value was low.

Comparative Example 6

In the same manner as in Comparative Example 5 except that crosslinked polystyrene particles (0.% by weight) as used in Example 7 was used in place of cohesive silica (0.1% by weight, average particle size 1.5 µm), a polyester film and a laminated steel sheet were obtained. The properties of these are shown in Table 1.

The polyester film and a laminated steel sheet obtained had a low product quality as were those produced in Comparative Example 5. A three-piece can was produced as mentioned above and coffee was filled therein. The product quality was poor in Comparative Example 5,

TABLE 1

| | Properties of film | | | Property of laminated |
| --- | --- | --- | --- | --- |
| | Coefficient of dynamic friction | Scratch resistance | Cyclic ET trimer (% by weight) | steel sheet Elution of oligomer |
| Ex. 4 | 0.28 | o | 0.38 | none |
| Ex. 5 | 0.28 | o | 0.40 | none |
| Ex. 6 | 0.31 | o | 0.41 | none |
| Ex. 7 | 0.35 | o | 0.40 | none |
| Ex. 8 | 0.39 | Δ | 0.40 | none |
| Ex. 9 | 0.28 | o | 0.39 | none |
| Ex. 10 | 0.28 | o | 0.51 | none |
| Ex. 11 | 0.30 | o | 0.52 | none |
| Ex. 12 | 0.32 | o | 0.52 | none |
| Co. Ex. 4 | 0.65 | x | 0.40 | none |
| Co. Ex. 5 | 0.65 | x | 1.0 | observed |
| Co. Ex. 6 | 0.62 | x | 1.0 | observed |

Note : ET = ethylene terephthalate

Example 13

A mixture of polyethylene terephthalate (melting point 254° C., 97 parts by weight) comprising cohesive silica (0.1% by weight, average particle size 1.5 µm) and polymethyl methacrylate spherical particles (1.0% by weight, average particle size 3.0 µm) crosslinked with trimethylolpropane trimethacrylate, which had an intrinsic viscosity of 0.70 and which was made to contain less amount of oligomer (cyclic ethylene terephthalate trimer 0.33% by weight) by the method employed in Example 1, and a block copolymer (3 parts by weight) of polyethylene terephthalate-polytetramethylene glycol ether was used as a resin for layer A. As the resin for layer B, used was a copolymerized polyester (melting point 215° C.) of terephthalic acid/isophthalic acid (molar ratio 83/17) and ethylene glycol, which comprised spherical silica (0.1% by weight) having an average particle size of 1.0 µm. The resin for the layer A and the resin for the layer B were respectively melted in a separate extruder and the molten resins were combined between the dies and extruded on a cooling drum to give an amorphous sheet. The sheet was drawn 3.5-fold to the longitudinal direction and 3.5-fold to the horizontal direction at 90° C. and cured with heat at 200° C. to give a 12 µm-thick polyester film (the thickness of layer A being 9µm and that of layer B being 3 µm).

The layer B side of the polyester film was lapped over a degreased cold-drawn steel sheet and passed between a metal roll heated at 230° C. and a rubber roll under the pressure of 20 kg/cm² to give a laminated steel sheet.

Example 14

In the same manner as in Example 13 except that polyethylene terephthalate (97 parts by weight) comprising cohesive silica (0.3% by weight, average particle size 1.5 µm) and spherical zeolite (1.0% by weight, average particle size 3.0 µm) showing almost monodisperse particle size distribution was used in place of polyethylene terephthalate (97 parts by weight) as used for the resin for layer A in Example 13, a polyester film and a laminated steel sheet were obtained.

Example 15

In the same manner as in Example 13 except that polystyrene resin (1.0% by weight) was used in place of crosslinked polymethyl methacrylate particles (1.0% by weight) as used for the resin for layer A, a polyester film and a laminated steel sheet were obtained.

Example 16

In the same manner as in Example 13 except that polyethylene terephthalate (97 parts by weight) comprising spherical polystyrene particles (1.0% by weight, average particle size 2.5 µm) crosslinked with divinylbenzene and showing almost monodisperse particle size distribution was used in place of polyethylene terephthalate (97 parts by weight) as used in Example 13 as the resin for layer A, and a copolymerized polyester (melting point 225° C.) of terephthalic acid/isophthalic acid (molar ratio 88/12) and ethylene glycol, comprising cohesive silica (0.1% by weight, average particle size 1.5 µm), was used as the resin for layer B, a polyester film and a laminated steel sheet were obtained.

Example 17

In the same manner as in Example 13 except that polyethylene terephthalate (97 parts by weight) comprising cohesive silica (0.6% by weight, average particle size 1.5 µm) was used in place of polyethylene terephthalate (97 parts by weight) as used for the resin for layer A in Example 13, a polyester film and a laminated steel sheet were obtained.

Example 18

In the same manner as in Example 13 except that polyethylene terephthalate (97 parts by weight) comprising cohesive silica (0.3% by weight, average particle size 1.5 µm) and low density polyethylene (1.0% by weight) was used in place of polyethylene terephthalate (97 parts by weight) as used for the resin for layer A in Example 13, a polyester film and a laminated steel sheet were obtained.

Example 19

In the same manner as in Example 16 except that polyethylene terephthalate (97 parts by weight) comprising a cyclic ethylene terephthalate trimer (0.4% by weight), cohesive silica (0.25% by weight, average particle size 2.4 µm) and butyl acrylate/methyl methacrylate/styrene spherical particles (1.0% by weight) crosslinked with divinylbenzene, the particles having an average particle size of 2.0 μm and almost monodisperse particle size distribution, which had an intrinsic viscosity of 0.75 and which was prepared by solid phase polymerization, was used in place of polyethylene terephthalate (97 parts by weight) as used for the resin for layer A in Example 16, a polyester film and a laminated steel sheet were obtained.

Example 20

In the same manner as in Example 19 except that spherical silica (1.0% by weight) having an average particle size of 2.0 μm and almost monodisperse particle size distribution was used in place of butyl acrylate/methyl methacrylate/styrene particles (1.0% by weight) crosslinked with divinylbenzene, a polyester film and a laminated steel sheet were obtained.

Example 21

In the same manner as in Example 19 except that 6-nylon (1.5% by weight) was used in place of butyl acrylate/methyl methacrylate/styrene particles (1.0% by weight) crosslinked with divinylbenzene, a polyester film and a laminated steel sheet were obtained.

The properties of the polyester films and laminated steel sheets obtained in the above Examples 13–21 are shown in Table 2.

The polyester films and laminated steel sheets obtained in Examples 13–21 showed fine sliding property between the film and the metal at high temperatures and superior scratch resistance.

In addition, elution of oligomer was void, proving high quality as a film for laminating with a metal and a laminated steel sheet.

The polyester films obtained in Examples 13–21 were applied to the inside of a can barrel, and the inside and outside faces of a bottom lid and a three-piece can was manufactured. No scratch was found on the surface of the film during can production and high speed can production was possible. Then, coffee was filled in said can and subjected to retort treatment. There were found no migration of oligomer or organic solvent from the film, no change in taste or smell of the coffee and no precipitation of oligomer on the outer surface of the bottom lid.

Comparative Example 7

In the same manner as in Example 13 except that crosslinked polymethyl methacrylate particles were not used for the resin for layer A, a polyester composite film and a laminated steel sheet were obtained. The properties of these are shown in Table 2.

The polyester composite film and the laminated steel sheet obtained were poor in sliding property between the film and a metal at high temperatures and in scratch resistance. Accordingly, the product value as a film for laminating with a metal and a laminated metal sheet was low.

In the same manner as above, a three-piece can was produced. During the can production, however, the surface of the film developed scratch flaws and the product value was low.

Comparative Example 8

In the same manner as in Example 13 except that polyethylene terephthalate (97 parts by weight) having an intrinsic viscosity of 0.65 and comprising a cyclic ethylene terephthalate trimer (1.0% by weight) and cohesive silica (0.1% by weight, average particle size 1.5 μm), which was produced by melt polymerization, was used in place of polyethylene terephthalate (97 parts by weight) as used in Example 13, a polyester composite film and a laminated steel sheet were obtained. The properties of these are shown in Table 2.

The polyester composite film and a laminated steel sheet obtained were poor in sliding property between the film and the metal at high temperatures and in scratch resistance. In addition, oligomer was contained in a high proportion and large elution of the oligomer was observed, proving their low quality as a film for laminating with a metal and a laminated metal sheet.

In the same manner as above, a three-piece can was produced. During the can production, the surface of the film developed scratch flaws. The can was filled with coffee and subjected to a retort treatment. As a result, oligomer precipitated on the outer surface of the bottom lid. Accordingly, the product value was low.

Comparative Example 9

In the same manner as in Example 13 except that the resin for layer A was used in place of the resin for layer B, a polyester composite film was obtained. Using the film obtained, a steel sheet was laminated in the same manner as in Example 13. The adhesion strength was poor and the film obtained was not very practical.

Comparative Example 10

In the same manner as in Example 13 except that the resin for layer B was used in place of the resin for layer A, a polyester composite film and a laminated steel sheet were obtained. The properties of these are shown in Table 2.

The polyester composite film and a laminated steel sheet obtained were poor in sliding property between the film and the metal at high temperatures and in scratch resistance. In addition, oligomer was contained in a high proportion and large elution of the oligomer was observed, proving low quality as a film for laminating with a metal and a laminated metal sheet.

In the same manner as above, a three-piece can was produced. During the can production, the surface of the film developed scratch flaws. The can was filled with coffee and subjected to a retort treatment. As a result, oligomer precipitated on the outer surface of the bottom lid. Accordingly, the product value was low.

Comparative Example 11

In the same manner as in Example 13 except that a copolymerized polyester (melting point 170° C., determined by a melting temperature measuring device manufactured by Metler) of terephthalic acid/isophthalic acid (molar ratio 67/33) and ethylene glycol, containing spherical silica (0.1% by weight) having an average particle size of 1.0 μm was used as a resin for layer B, a polyester composite film was obtained. The film was laminated with a steel sheet in the same manner as in Example 13. As a result, wrinkles were developed and the film was not practically used for laminating with a metal sheet.

Comparative Example 12

In the same manner as in Example 8 except that crosslinked polystyrene particles (0.1% by weight) as used in Example 16 was used as the resin for layer A in place of the cohesive silica having an average particle size of 1.5 μm, a polyester composite film and a laminated steel sheet were obtained. The properties of these are shown in Table 2.

The polyester composite film and a laminated steel sheet obtained had poor quality as were those obtained in Comparative Example 8. A three-piece can was produced and coffee was filled therein. The can showed low product value as in Comparative Example 8.

TABLE 2

Properties of film

| | Layer A | | | Layer B | Property of laminated steel sheet |
|---|---|---|---|---|---|
| | Coefficient of dynamic friction | Scratch resistance | Cyclic ET trimer (% by weight) | MT (°C.) | Elution of oligomer |
| Ex. 13 | 0.28 | o | 0.38 | 215 | none |
| Ex. 14 | 0.28 | o | 0.40 | 215 | none |
| Ex. 15 | 0.31 | o | 0.41 | 215 | none |
| Ex. 16 | 0.35 | o | 0.40 | 225 | none |
| Ex. 17 | 0.39 | Δ | 0.40 | 215 | none |
| Ex. 18 | 0.28 | o | 0.39 | 215 | none |
| Ex. 19 | 0.28 | o | 0.51 | 225 | none |
| Ex. 20 | 0.30 | o | 0.52 | 225 | none |
| Ex. 21 | 0.32 | o | 0.52 | 225 | none |
| Co. Ex. 7 | 0.65 | x | 0.40 | 215 | none |
| Co. Ex. 8 | 0.65 | x | 1.0 | 215 | observed |
| Co. Ex. 9 | 0.66 | x | 0.38 | 254 | none |
| Co. Ex. 10 | 0.68 | x | 0.78 | 215 | observed |
| Co. Ex. 11 | 0.65 | x | 0.38 | 170 | none |
| Co. Ex. 12 | 0.62 | x | 1.0 | 215 | observed |

Note: ET = ethylene terephthalate

As described in the foregoing, the polyester film of the present invention having a coefficient of dynamic friction between the film and a metal at 80° C. of not more than 0.45 is superior in sliding property between the film and the metal at high temperatures. When cans are manufactured from the film of the invention, the film shows superior scratch resistance on the film surfaces during can production, permitting high speed can production. When the film comprising a cyclic ethylene terephthalate trimer in a proportion of not more than 0.7% by weight is used, moreover, elution of oligomer from the film can be suppressed even upon heat treatment after packing food therein (retort treatment), so that the change in taste and smell caused by the migration of the oligomer into the food or degraded appearance of the surface of the film caused by the oligomer precipitation are avoided.

The polyester film of the present invention is suitably used for laminating with a metal sheet and metal containers suitable for packing the food can be manufactured from the laminated metal sheet.

What is claimed is:

1. A polyester film adapted to be laminated to a tin-free steel, said film having a coefficient of dynamic friction between the film and tin-free steel at 80° C. of not more than 0.45.

2. The polyester film of claim 1, composed of a polyester comprising an ethylene terephthalate unit in a proportion of not less than 70% by mole.

3. The polyester film of claim 1, comprising a cyclic ethylene terephthalate trimer, said trimer present in a proportion of not more than 0.7% by weight per total amount of polyester.

4. The polyester film of claim 1, composed of a polyester composition comprising polymer particles having an average particle size of 0.5–5 μm in a proportion of 0.3–5% by weight, said polymer being at least one member selected from the group consisting of polymers of acrylic monomer, polymers of styrene monomer, copolymers of acrylic monomer and styrene monomer, copolymers of styrene monomer and crosslinking monomer, copolymers of acrylic monomer, styrene monomer and crosslinking monomer, melamine resins, benzoguanamine resins, phenol resins and silicone resins.

5. The polyester film of claim 1, composed of a polyester composition comprising inorganic fine particles, having an average particle size of 0.5–5 μm in a proportion of 0.3–5% by weight.

6. The polyester film of claim 1, composed of a polyester composition comprising a thermoplastic resin incompatible with polyester in a proportion of 0.3–5% by weight.

7. A polyester film adapted to be laminated to a tin-free steel, said film comprising a first polyester layer having a coefficient of dynamic friction between the film and tin-free steel at 80° C. of not more than 0.45 and a second polyester layer having a melting point of 180°–240° C.

8. A laminated metal sheet comprising the polyester film of any one of claims 1-7 laminated with said metal sheet.

9. A metal container formed from the laminated metal sheet of claim 8.

10. A polyester film adapted to be laminated to aluminum, said film having a coefficient of dynamic friction between the film and aluminum at 80° C. of not more than 0.45.

11. The polyester film of claim 10, composed of a polyester comprising an ethylene terephthalate unit in a proportion of not less than 70% by mole.

12. The polyester film of claim 10, comprising a cyclic ethylene terephthalate trimer, said trimer present in a proportion of not more than 0.7% by weight per total amount of polyester.

13. The polyester film of claim 10, composed of a polyester composition comprising polymer particles having an average particle size of 0.5–5 μm in a proportion of 0.3–5% by weight, said polymer being at least one member selected from the group consisting of polymers of acrylic monomer, polymers of styrene monomer, copolymers of acrylic monomer and styrene monomer, copolymers of acrylic monomer and crosslinking monomer, copolymers of styrene monomer and crosslinking monomer, copolymers of acrylic monomer, styrene monomer and crosslinking monomer, melamine resins, benzoguanamine resins, phenol resins and silicone resins.

14. The polyester film of claim 10, composed of a polyester composition comprising inorganic fine particles having an average particle size of 0.5–5 μm in a proportion of 0.3–5% by weight.

15. The polyester film of claim 10, composed of a polyester composition comprising a thermoplastic resin incompatible with polyester in a proportion of 0.3–5% by weight.

16. A polyester film adapted to be laminated to aluminum, said film comprising a first polyester layer having a coefficient of dynamic friction between the film and aluminum at 80° C. of not more than 0.45 and a second polyester layer having a melting point of 180°–240° C.

17. A laminated metal sheet comprising the polyester film of any one of claims 10-16 laminated with said metal sheet.

18. A metal container formed from the laminated metal sheet of claim 17.

* * * * *

UNITED STATES PATENT AND TRADEMARK OFFICE
CERTIFICATE OF CORRECTION

PATENT NO. : 5,498,454
DATED : March 12, 1996
INVENTOR(S) : Kuze et al.

It is certified that error appears in the above-identified patent and that said Letters Patent is hereby corrected as shown below:

Column 9, line 37, "an Intrinsic" should read --an intrinsic--.

Column 10, line 2, "treatment In the" should read --treatment in the--.

Column 11, line 6, "and dried," should read --and dried.--.

Column 13, line 15, "(0.%" should read --(0.1%--.

Column 13, line 24, "Example 5," should read --Example 5.--

Column 13, line 30, "steel sheet" should be moved up to the line under "laminated".

Column 17, line 15, "layer B" should be moved up to be line with Layer A.

Column 18, line 5, "of styrene" should read --of acrylic monomer and crosslinking monomer, copolymers of styrene--.

UNITED STATES PATENT AND TRADEMARK OFFICE
CERTIFICATE OF CORRECTION

PATENT NO. : 5,498,454
DATED : March 12, 1996
INVENTOR(S) : Kuze, et. al.

It is certified that error appears in the above-indentified patent and that said Letters Patent is hereby corrected as shown below:

Column 18, line 5, "of styrene" should read-- of acrylic monomer and crosslinking monomer, copolymers of styrene--.

Signed and Sealed this

Twenty-fourth Day of September, 1996

Attest:

BRUCE LEHMAN

Attesting Officer

Commissioner of Patents and Trademarks